(12) United States Patent
Hiraga et al.

(10) Patent No.: US 10,503,147 B2
(45) Date of Patent: Dec. 10, 2019

(54) PROGRAM GENERATING APPARATUS

(71) Applicant: FANUC CORPORATION, Yamanashi (JP)

(72) Inventors: Kaoru Hiraga, Yamanashi (JP); Shouta Irie, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 18 days.

(21) Appl. No.: 15/808,930

(22) Filed: Nov. 10, 2017

(65) Prior Publication Data

US 2018/0136635 A1    May 17, 2018

(30) Foreign Application Priority Data

Nov. 11, 2016    (JP) ................. 2016-221014

(51) Int. Cl.
| | | |
|---|---|---|
| *B23H 7/20* | (2006.01) | |
| *B25J 9/16* | (2006.01) | |
| *G05B 19/402* | (2006.01) | |
| *G05B 19/4093* | (2006.01) | |
| *G05B 19/4097* | (2006.01) | |
| *B23H 7/18* | (2006.01) | |

(Continued)

(52) U.S. Cl.
CPC ......... *G05B 19/40932* (2013.01); *B23H 7/02* (2013.01); *B23H 7/18* (2013.01); *B23H 7/20* (2013.01); *B23H 11/00* (2013.01); *B25J 9/1656* (2013.01); *G05B 19/402* (2013.01); *G05B 19/4097* (2013.01); *G05B 2219/31405* (2013.01); *G05B 2219/45043* (2013.01); *G05B 2219/45221* (2013.01); *Y02P 90/265* (2015.11)

(58) Field of Classification Search
CPC . B23H 7/02; B23H 7/20; B25J 9/1656; G05B 19/402; G05B 19/4097
See application file for complete search history.

(56) References Cited

U.S. PATENT DOCUMENTS 5,015,814 A * 5/1991 Morishita ................ B23H 7/02
219/69.12
5,077,457 A    12/1991 Onaka et al.
(Continued)

FOREIGN PATENT DOCUMENTS

CN    1797248 A    7/2006
CN    104334303 A    2/2015
(Continued)

OTHER PUBLICATIONS

Extended European Search Report in EP Application No. 17001828.7, dated Apr. 10, 2018, 8 pp.

*Primary Examiner* — Mark A Connolly
(74) *Attorney, Agent, or Firm* — Hauptman Ham, LLP

(57) ABSTRACT

A program generating apparatus includes a machining program generating unit configured to generate a machining program for controlling a wire electrical discharge machine so as to machine a workpiece in accordance with a machining shape of the workpiece input by a user and so as to fix a core which is produced when the workpiece is machined, to the workpiece. In the program generating apparatus, a core handling program generating unit generates a core handling program for controlling a robot so as to remove the core from the workpiece by applying an impact to the core in accordance with the input machining shape of the workpiece.

4 Claims, 9 Drawing Sheets

(51) Int. Cl.
*B23H 7/02* (2006.01)
*B23H 11/00* (2006.01)

(56) References Cited

U.S. PATENT DOCUMENTS

| | | | |
|---|---|---|---|
| 5,164,563 A | 11/1992 | Aso et al. | |
| 5,253,178 A * | 10/1993 | Nakayama | B23H 7/02 219/69.12 |
| 5,753,880 A | 5/1998 | Kajitori et al. | |
| 5,914,054 A * | 6/1999 | Ito | B23H 7/02 219/69.11 |
| 2012/0193326 A1 | 8/2012 | Mitsuyasu | |
| 2014/0014625 A1 | 1/2014 | Yamaoka et al. | |
| 2015/0352647 A1 | 12/2015 | Abe et al. | |
| 2016/0059369 A1* | 3/2016 | Minotti | B23H 7/02 219/69.12 |
| 2016/0263689 A1* | 9/2016 | Kasai | B23H 1/02 |

FOREIGN PATENT DOCUMENTS

| | | |
|---|---|---|
| EP | 2340907 A2 | 7/2011 |
| JP | 56-095540 A | 8/1981 |
| JP | S63-174817 A | 7/1988 |
| JP | H01163028 U | 11/1989 |
| JP | 02-145215 A | 6/1990 |
| JP | H2-311219 A | 12/1990 |
| JP | H0379227 A | 4/1991 |
| JP | H3-166017 A | 7/1991 |
| JP | H6-22764 B2 | 3/1994 |
| JP | H0819919 A | 1/1996 |
| JP | 08-309622 A | 11/1996 |
| JP | 2011-136409 A | 7/2011 |
| JP | 2012-166332 A | 9/2012 |
| JP | 2013-144335 A | 7/2013 |
| JP | 2014-014907 A | 1/2014 |
| JP | 2014-024132 A | 2/2014 |
| JP | 2015229207 A | 12/2015 |
| TW | 541217 B | 7/2003 |
| TW | 201121683 A1 | 7/2011 |

* cited by examiner

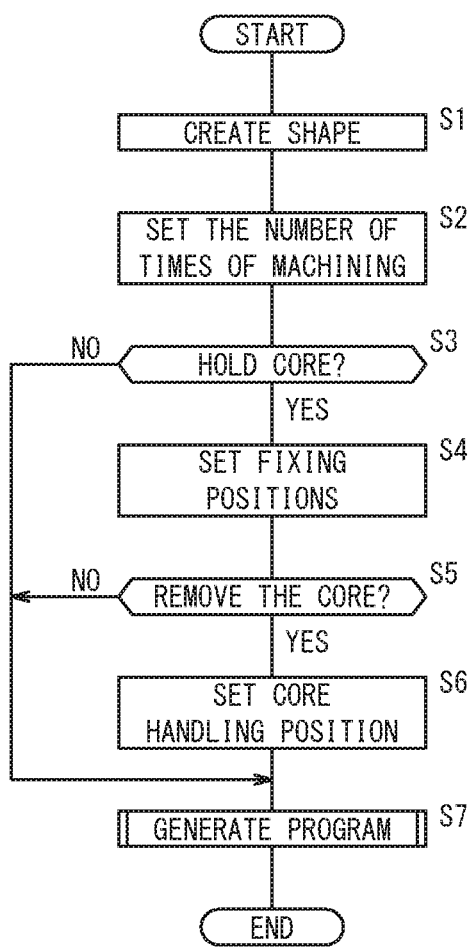

PROGRAM GENERATING APPARATUS

CROSS-REFERENCE TO RELATED APPLICATION

This application is based upon and claims the benefit of priority from Japanese Patent Application No. 2016-221014 filed on Nov. 11, 2016, the contents of which are incorporated herein by reference.

BACKGROUND OF THE INVENTION

Field of the Invention

The present invention relates to a program generating apparatus that generates a program for controlling a wire electrical discharge machine.

Description of the Related Art

Japanese Laid-Open Patent Publication No. 2013-144335 discloses an apparatus that generates a machining program for controlling a wire electrical discharge machine so as to cause a workpiece to hold a core, which is an inner portion of the workpiece, in place inside the workpiece by depositing the component of a wire electrode to arbitrary regions of the core.

SUMMARY OF THE INVENTION

After a roughing is finished by the wire electrical discharge machine, core handling for removing cores from the workpiece is performed. The core handling is performed by applying an impact to the core held in the workpiece by means of a robot. However, in the technology disclosed in Japanese Laid-Open Patent Publication No. 2013-144335, since no program is generated to make a robot perform core handling, it is necessary for the user to separately create a program for causing the robot to perform core handling, which requires a lot of effort by the user.

The present invention has been devised to solve the above problem, and it is therefore an object of the present invention to provide a program generating apparatus capable of reducing the user's effort for programming.

According to one aspect of the present invention, there is provided a program generating apparatus including: an input unit configured to be operated by a user to thereby input a machining shape of a workpiece, and a program generating unit configured to generate a machining program configured to control a wire electrical discharge machine so as to machine the workpiece in accordance with the input machining shape of the workpiece and so as to fix, to the workpiece, a core which is produced when the workpiece is machined. In the program generating apparatus, the program generating unit generates a core handling program configured to control a robot so as to remove the core from the workpiece by applying an impact to the core in accordance with the input machining shape of the workpiece. With this configuration, it is possible to reduce the user's labor required for programming.

The above program generating apparatus according to the aspect of the present invention may further include a display unit configured to display on a screen of the display unit the input machining shape of the workpiece and a shape of the core obtained in accordance with the machining shape of the workpiece, and may be constructed such that the input unit designates an arbitrary position on the core displayed on the screen of the display unit by being operated by the user, and the program generating unit generates a core handling program configured to set the arbitrary position designated by the input unit as a core handling position and control the robot so as to apply an impact to the core at the core handling position. This configuration enables the user to designate a core handling position by a simple operation while the program generating unit can generate a program for causing the robot to perform core handling at the core handling position.

In the above program generating apparatus according to the aspect of the present invention, the program generating unit may generate a core handling program configured to set a center of gravity of a shape of the core obtained in accordance with the input machining shape of the workpiece as a core handling position and control the robot so as to apply an impact to the core at the core handling position. As a result, the core handling position can be automatically set without the need of any user input as to core handling position, and the program generating unit can generate a program for causing the robot to perform core handling at the core handling position.

In the above program generating apparatus according to the aspect of the present invention, when the core obtained in accordance with the input machining shape of the workpiece includes multiple cores, the program generating unit may generate a core handling program configured to set the core handling position for each of the cores and control the robot so as to apply an impact to each of the cores at the set core handling position. Thereby, it is possible to generate a program for causing the robot to perform core handling on multiple cores.

According to the present invention, it is possible to reduce the user's labor required for programming.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a flowchart showing the flow of a program generating process performed in a processing unit;

FIG. 7 is a diagram showing an example of a main program generated by the main program generating unit;

FIG. 8 is a diagram showing an example of a machining program generated by the machining program generating unit; and FIG. 9 is a diagram showing an example of a core handling program generated by the core handling program generating unit.

DESCRIPTION OF THE PREFERRED EMBODIMENTS

A preferred embodiment of a program generating apparatus according to the present invention will be detailed below with reference to the accompanying drawings.

[Overall Configuration of Wire Electrical Discharge Machining System]

Figure 1:
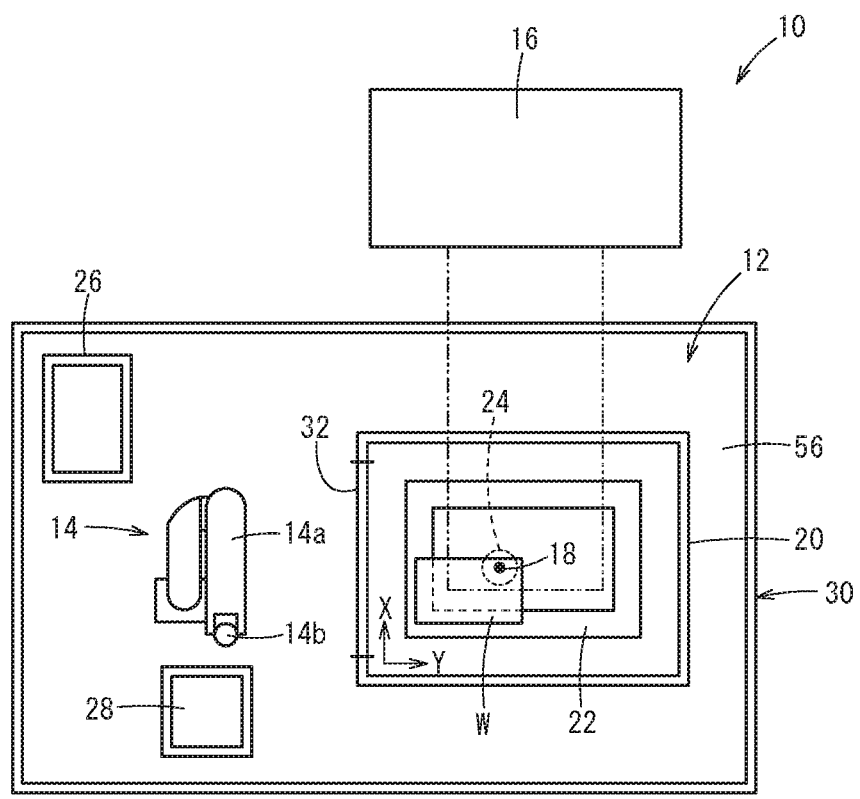
FIG. 1 is a schematic diagram of a wire electrical discharge machining system having a wire electrical discharge machine.
Figure 2:
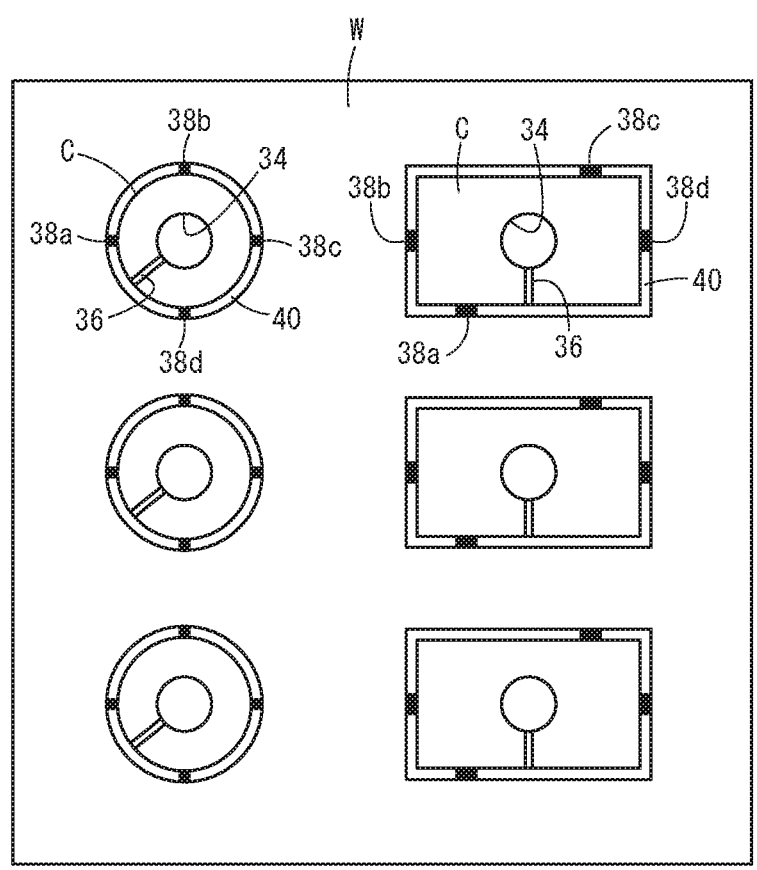
FIG. 2 is a schematic diagram showing an example of a workpiece that has been primarily machined.

FIG. 1 is a schematic diagram of a wire electrical discharge machining system 10 having a wire electrical discharge machine 12. FIG. 2 is a schematic diagram showing an example of a workpiece W that has been subjected to primary machining. The wire electrical discharge machining system 10 includes a wire electrical discharge machine 12, a robot 14 and a numerical control device 16. The wire electrical discharge machine 12 and the robot 14 are installed on a base 56.

The wire electrical discharge machine 12 is a machine tool that performs electrical discharge machining on a workpiece W by applying a voltage across an electrode gap between a wire electrode 18 and the workpiece W in a dielectric working fluid to generate electrical discharge. The wire electrode 18 is made of, for example, tungsten-based, copper alloy-based, brass-based metal or the like. The material of the workpiece W is, for example, a metal material such as an iron-based material, a superhard material (e.g., tungsten carbide), or the like.

The wire electrical discharge machine 12 includes a work-pan 20 capable of storing a dielectric working fluid such as deionized water, oil, etc., used in electrical discharge machining. A worktable 22 on which a workpiece W is placed is disposed in the work-pan 20. Further, a lifting door 32 which moves up and down automatically is provided on a side surface portion of the work-pan 20. The worktable 22 is provided so as to be movable in the X-axis and Y-axis directions orthogonal to each other, by unillustrated servomotors. Wire guides 24 for guiding the wire electrode 18 are arranged above and below the worktable 22 in the work-pan 20. In FIG. 1, the wire guide 24 disposed below the worktable 22 is not shown. The periphery of the individual devices installed on the base 56 is surrounded by a wall 30. The wire electrical discharge machine 12 machines the workpiece W into a desired shape by moving the worktable 22 with the workpiece W placed thereon while applying voltage to the wire electrode 18.

The wire electrical discharge machine 12 has a core holding function of causing the workpiece W to hold a core C formed at the time of primary machining on the workpiece W. In the primary machining by the wire electrical discharge machine 12, as shown in FIG. 2, the wire electrode 18 starts from a start hole 34 of the workpiece W, follows an approach path 36, makes a circuit along a shaping line 40, and then returns to the start hole 34 passing through the approach path 36 once again. The wire electrical discharge machine 12 welds and deposits the component of the wire electrode 18 at multiple arbitrary points on the shaping line 40, whereby the core C is fixed to the workpiece W to thereby cause the workpiece W to hold the core C at the points. FIG. 2 shows an example in which four fixing positions 38a to 38d are formed, but the number of fixing positions 38a to 38d is not limited. In the following description, the fixing positions 38a to 38d are generally described as fixing positions 38.

The robot 14 is an articulated robot having an arm 14a and a detachable end effector 14b attached to a distal end of the arm 14a. The robot 14 can perform various operations such as gripping the workpiece W by the end effector 14b. The robot 14 can move the end effector 14b to a desired position by moving the joints of the arm 14a. The robot 14 grips an unmachined workpiece W, which is stored in a workpiece stocker 26, by the end effector 14b and attaches it to the worktable 22. Further, the robot 14 detaches the workpiece W that has been primarily machined, from the worktable 22 by the end effector 14b and places the workpiece W within a core handling area 28. The robot 14 performs a core handling process on the workpiece W. The core handling process is a process of applying an impact to the core C held by the workpiece W by the end effector 14b of the robot 14 to thereby remove the core C from the workpiece W.

The numerical control device 16 generates control signals for controlling the wire electrical discharge machine 12 and the robot 14 in accordance with the machining program and the core handling program, and outputs the control signals to the wire electrical discharge machine 12 and the robot 14. The machining program and the core handling program are generated on an external computer 44 (FIG. 3) and sent to the numerical control device 16.

[Program Generating Apparatus]

Figure 3:
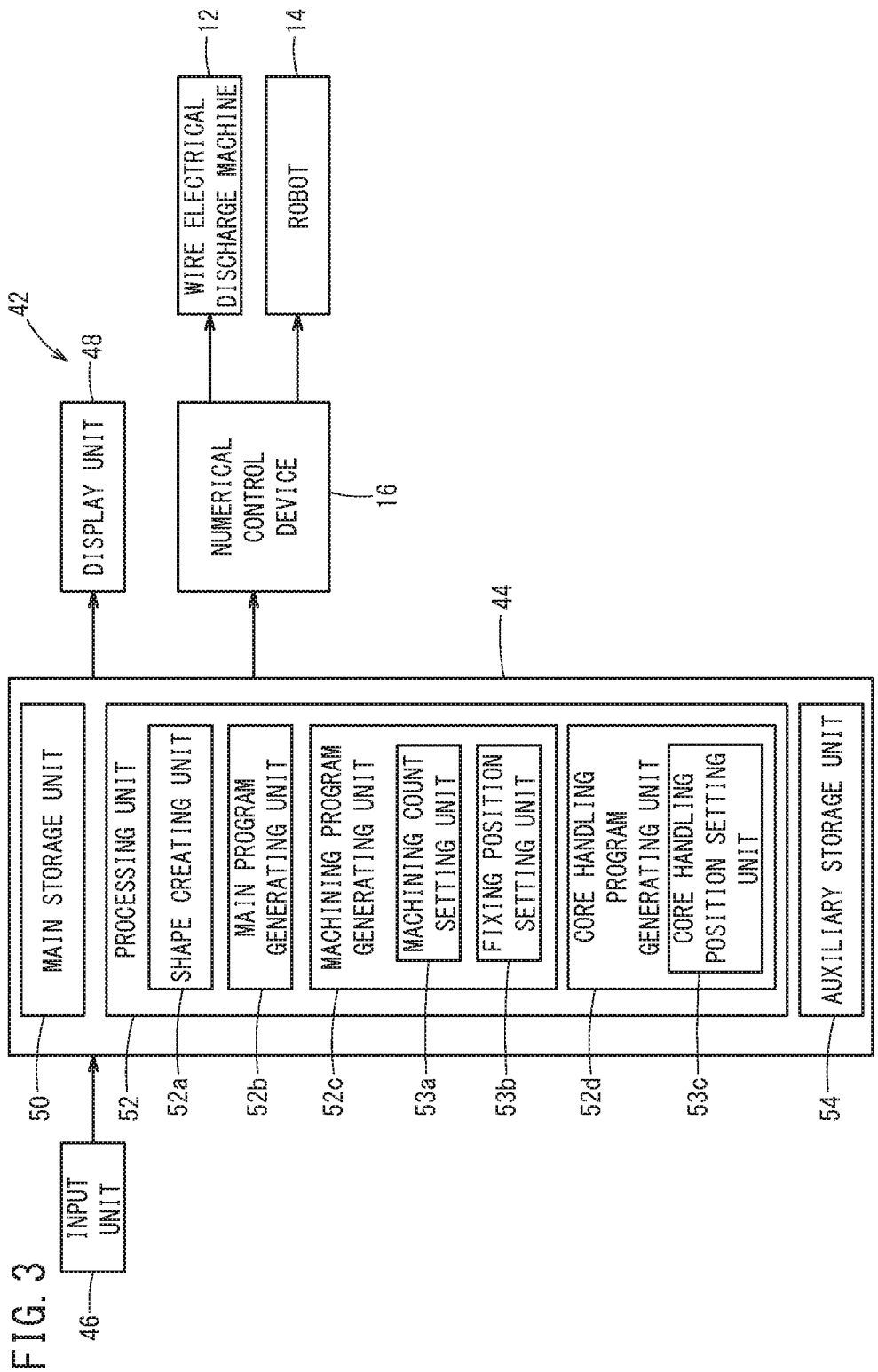
FIG. 3 is a block diagram of a program generating apparatus.

FIG. 3 is a block diagram of a program generating apparatus 42. The program generating apparatus 42 receives data on a machining shape of the workpiece W input by the user, and generates a machining program and a core handling program for controlling the wire electrical discharge machine 12 and the robot 14 according to the input data of the machining shape of the workpiece W. The program generating apparatus 42 includes a computer 44, an input unit 46, and a display unit 48.

The computer 44 is, for example, a personal computer or the like. The input unit 46 and the display unit 48 are connected to the computer 44. The input unit 46 is a device capable of entering characters, designation of positions, graphics, etc., by user operation. Examples of the input unit may include a keyboard, a mouse, etc. The display unit 48 is a device capable of displaying characters and images on the screen, such as a liquid crystal display and the like. The computer 44 includes a main storage unit 50, a processing unit 52, and an auxiliary storage unit 54. The main storage unit 50 is, for example, a RAM or the like. The processing unit 52 is a CPU or the like, including a shape creating unit 52a, a main program generating unit 52b, a machining program generating unit 52c, and a core handling program generating unit 52d. The auxiliary storage unit 54 is, for example, a magnetic disk, an optical disk or the like.

The main storage unit 50 temporarily stores information input and output with respect to the processing unit 52. Though every piece of the information input to and output from the processing unit 52 passes through the main storage unit 50, description to the effect that the information passes through the main storage unit 50 will be omitted in the following explanation. The processing unit 52 performs a variety of arithmetic processing based on information input from the input unit 46, the programs stored in the auxiliary storage unit 54, and the like. The auxiliary storage unit 54 stores various kinds of information in addition to the program to be executed in the processing unit 52 as described above.

The shape creating unit 52a creates a machining shape of the workpiece W. The shape creating unit 52a reads information on the machining shape of the workpiece W input through the input unit 46 by user operation. For inputting the information on the machining shape of the workpiece W, the user selects a desired pattern from among linear patterns, curved line patterns, etc., by clicking the corresponding icon on the display unit 48 using the mouse, and then enters information on the lengths of the linear patterns, information on the radii of the curved line patterns, information on dimensional tolerance, etc., through the keyboard. The shape creating unit 52a creates a machining shape of the workpiece W based on the read information on the machining shape of the workpiece W. The machining shape of the workpiece W created by the shape creating unit 52a is added with the information on dimensional tolerance. Further, the shape creating unit 52a creates the shape of the core C based on the created machining shape of the workpiece W.

The shape creating unit 52a computes control signals for displaying the created machining shape of the workpiece W and the created shape of the core C on the screen of the display unit 48, and outputs the computed control signals to the display unit 48. The display unit 48, based on the control signals, displays the machining shape of the workpiece W and the shape of the core C on the screen. The shape creating unit 52a outputs the created machining shape of the workpiece W and the created shape of the core C to the auxiliary storage unit 54. The auxiliary storage unit 54 stores the machining shape of the workpiece W and the shape of the core C output from the shape creating unit 52a thereinto.

The main program generating unit 52b generates a main program that causes the numerical control device 16 to control the wire electrical discharge machine 12 and the robot 14. The main program is a program including a command to control the robot 14 so as to attach the workpiece W to the worktable 22, a command to control the robot 14 so as to detach the workpiece W from the worktable 22, a command to invoke the machining program, and other commands.

The machining program generating unit 52c generates a machining program that causes the numerical control device 16 to control the wire electrical discharge machine 12 and the robot 14. The machining program generating unit 52c includes a machining count setting unit 53a and a fixing position setting unit 53b.

The machining count setting unit 53a sets the number of times that the workpiece W is machined. The machining count setting unit 53a sets the number of times of machining depending on the dimensional tolerance of the workpiece W. Alternatively, the user may input the number of times by operating the input unit 46, and the machining count setting unit 53a may set the input number of times as the number of times of machining. For example, when the number of times of machining is set at 3, primary machining (roughing), secondary machining (semi-finishing), and tertiary machining (finishing) are performed on the workpiece W.

In fixing the core C to the workpiece W, the fixing position setting unit 53b sets fixing positions 38 at which the component of the wire electrode 18 is welded and deposited. The fixing position setting unit 53b receives the machining shape of the workpiece W and the shape of the core C from the auxiliary storage unit 54, and determines the optimum fixing positions 38 based on the center of gravity of the input shape of the core C and other factors. It is also possible for the user to operate the input unit 46 and select positions on the machining shape of the workpiece W and the shape of the core C displayed on the screen of the display unit 48, so that the fixing position setting unit 53b sets the selected positions as the fixing positions 38.

The machining program generating unit 52c generates a machining program, based on the machining shape of the workpiece W and the shape of the core C read from the auxiliary storage unit 54, the number of times of machining set by the machining count setting unit 53a and the fixing positions 38 set by the fixing position setting unit 53b. The machining program generating unit 52c outputs the generated machining program to the auxiliary storage unit 54, which stores the received machining program.

The core handling program generating unit 52d generates a core handling program that causes the numerical control device 16 to control the wire electrical discharge machine 12 and the robot 14. The core handling program generating unit 52d includes a core handling position setting unit 53c.

Figure 4A:
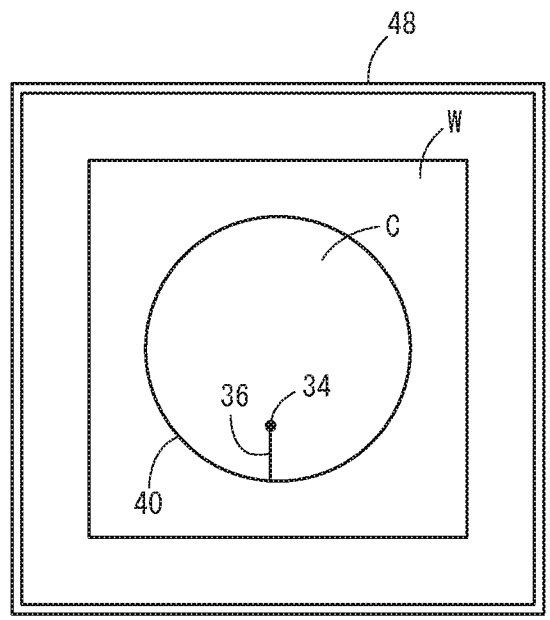
FIG. 4A is a diagram showing a display example of the screen of a display unit before setting a core handling position.
Figure 4B:
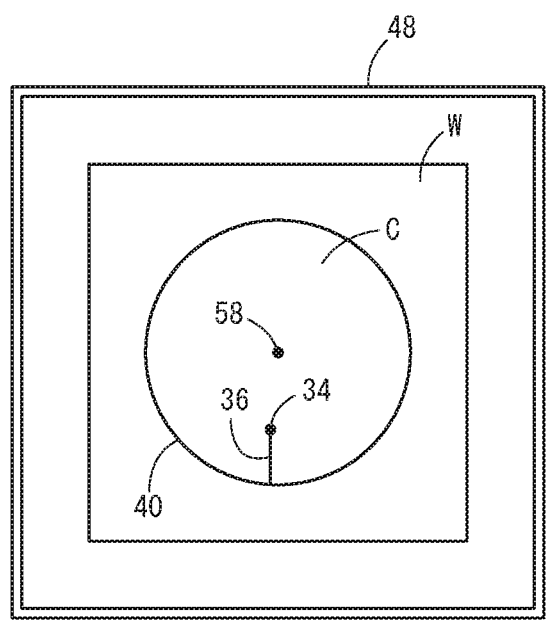
FIG. 4B is a diagram showing a display example of the screen of the display unit after setting a core handling position.

The core handling position setting unit 53c sets a core handling position 58 at which the robot 14 applies an impact to the core C. FIG. 4A is a diagram showing a display example of the screen of the display unit 48 before setting the core handling position 58. FIG. 4B is a diagram showing a display example of the screen of the display unit 48 after setting the core handling position 58.

The core handling position setting unit 53c reads the machining shape of the workpiece W and the shape of the core C stored in the auxiliary storage unit 54. The core handling position setting unit 53c computes control signals for displaying the machining shape of the workpiece W and the shape of the core C thus read, on the screen of the display unit 48, and outputs the signals to the display unit 48. The display unit 48, based on the control signals, displays the machining shape of the workpiece W and the shape of the core C on the screen (FIG. 4A).

The user operates the input unit 46 and designates a desired position on the core C displayed on the screen of the display unit 48, as a core handling position 58. The core handling position setting unit 53c sets the position designated by the user, as the core handling position 58. The core handling position setting unit 53c calculates a control signal for displaying a mark indicating the core handling position 58 designated by the user on the screen of the display unit 48 and outputs the signal to the display unit 48. The display unit 48, based on the control signal, displays the mark indicating the core handling position 58 on the screen (FIG. 4B). The core handling position setting unit 53c may calculate the center of gravity of the read shape of the core C, and set the calculated center of gravity as a core handling position 58. The center of gravity of the core C herein is the center of gravity of the shape defined on a plane by the shaping line 40 in FIG. 4B.

The core handling program generating unit 52d generates a core handling program, based on the machining shape of the workpiece W and the shape of the core C read from the auxiliary storage unit 54 and also based on the core handling position 58 set by the core handling position setting unit 53c. The core handling program generating unit 52d outputs the generated core handling program to the auxiliary storage unit 54, and the auxiliary storage unit 54 stores therein the core handling program received from the core handling program generating unit 52d.

[Program Generation Process]

FIG. 5 is a flowchart showing the flow of a program generation process performed in the processing unit 52.

At step S1, the shape creating unit 52a creates a machining shape of the workpiece W, and the control proceeds to step S2. At step S2, the machining count setting unit 53a sets the number of times of machining the workpiece W, and then the control goes to step S3.

At step S3, the processing unit 52 determines whether to hold a core C. When a core C should be held, the control proceeds to step S4. When a core C is not held, the control proceeds to step S7. Determination on whether to hold a core C is made based on whether or not a core C is produced from the created machining shape of the workpiece W when the workpiece W is machined. That is, the processing unit 52 determines that a core C should be held when the core C is produced in machining the workpiece W, and determines that a core C need not be held when no core C is formed in machining the workpiece W. Further, this determination may be made by user input through the input unit 46, i.e., by entering the user's decision on whether to hold a core C.

At step S4, the fixing position setting unit 53*b* sets fixing positions 38, and then the control goes to step S5. At step S5, the processing unit 52 determines whether or not the core C should be removed. When removal of the core C is needed, the control goes to step S6. When removal of the core C is not needed, the control goes to step S7. The user operates the input unit 46 and inputs the user's decision on whether or not to cause the robot 14 to perform core handling. The processing unit 52 determines whether or not to remove the core C based on the information input by the user. If no robot 14 for performing the core handling performs the core handling, a worker taps the core C with a hammer or the like to remove the core C.

At step S6, the core handling position 58 is set by the core handling position setting unit 53*c*, and the control proceeds to step S7. At step S7, the main program generating unit 52*b*, the machining program generating unit 52*c* and the core handling program generating unit 52*d* generate a main program, a machining program and a core handling program, and then the program generation process is completed.

Figure 6:
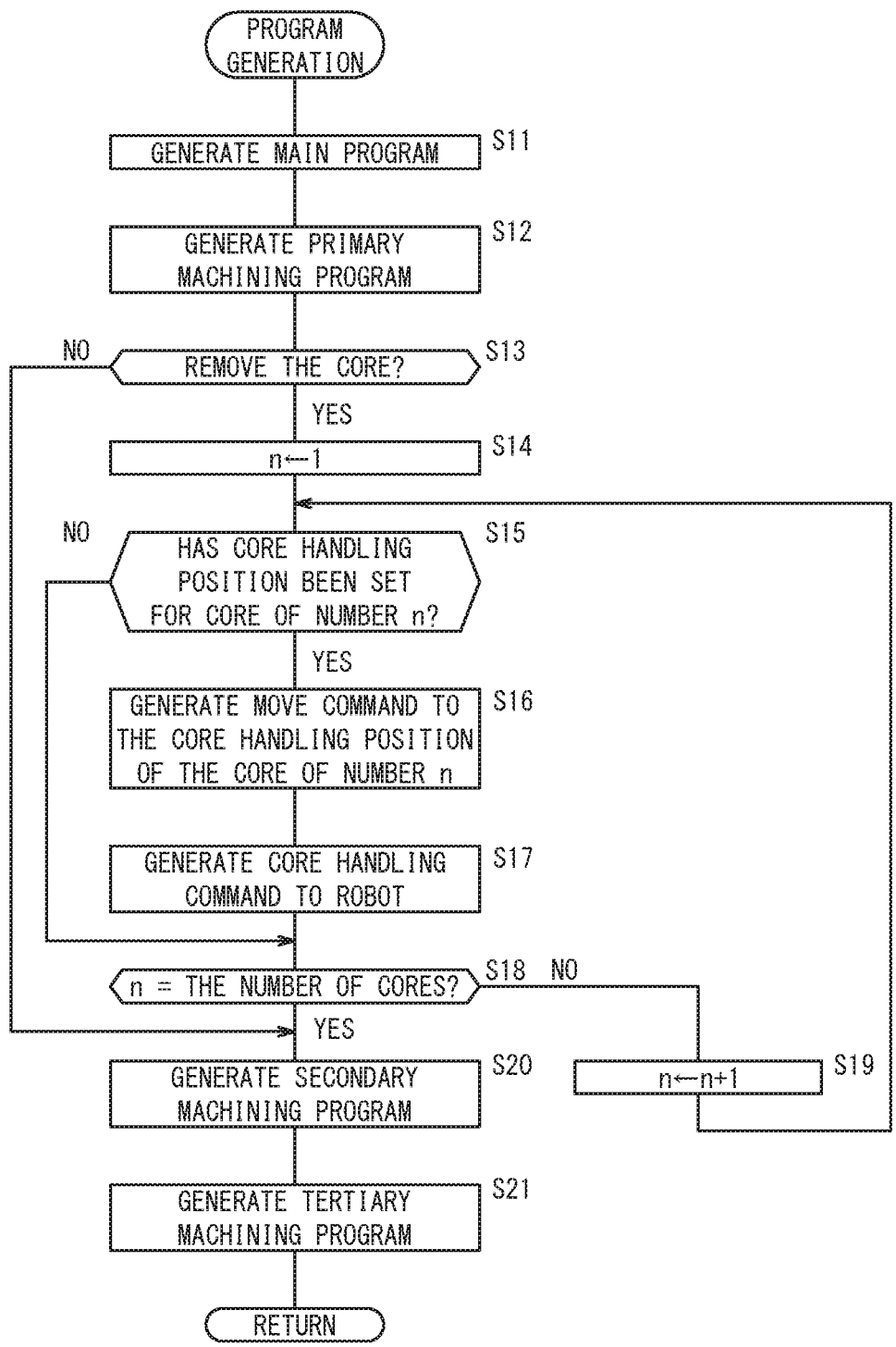
FIG. 6 is a flowchart showing the flow of a program generating process performed in a main program generating unit, a machining program generating unit and a core handling program generating unit.

FIG. 6 is a flowchart showing the flow of the program generating process performed in the main program generating unit 52*b*, the machining program generating unit 52*c* and the core handling program generating unit 52*d*. FIG. 6 shows an example of a program generation process when the number of times of machining is set at 3.

At step S11, a main program is generated, and the control proceeds to step S12. At step S12, a program (primary machining program) for controlling the wire electrical discharge machine 12 so as to perform primary machining on the workpiece W is generated, and then the control proceeds to step S13.

At step S13, it is determined whether or not execution of core handling has been selected at step S5 in FIG. 5. If an affirmative determination is made, the control proceeds to step S14, whereas if a negative determination is made, the control proceeds to step S20.

At step S14, a variable n is set at 1, and the control goes to step S15. At step S15, it is determined whether or not a core handling position 58 has been set for the core C of number n. When a core handling position 58 has been set for the core C of number n, the control proceeds to S16. When no core handling position 58 has been set for the core C of number n, the control proceeds to step S18. For example, there are cases where multiple cores C are produced in a single workpiece W as shown in FIG. 2. Each core C is assigned with a shape number in order from "1", and a core C of number n indicates a core C assigned with a number "n".

At step S16, a command for controlling the robot 14 so as to move the end effector 14*b* to the core handling position 58 of the core C of number n is generated, and the control proceeds to step S17. At step S17, a command for the end effector 14*b* to perform core handling, i.e., apply an impact to the core C, is generated, and then the control proceeds to step S18.

At step S18, it is determined whether the variable n is equal to the number of the cores C. When the variable n coincides with the number of the cores C, the process goes to step S20. If the variable n is not equal to the number of cores C, the control goes to step S19.

At step S19, the variable n is incremented by one, and the control proceeds to step S15. At step S20, a program (secondary machining program) for controlling the wire electrical discharge machine 12 so as to perform secondary machining on the workpiece W is generated, and then the control proceeds to step S21. At step S21, a program (tertiary machining program) for controlling the wire electrical discharge machine 12 so as to perform tertiary machining on the workpiece W is generated, and then the program generation process is ended.

[Machining Program Example]

Figure 7:
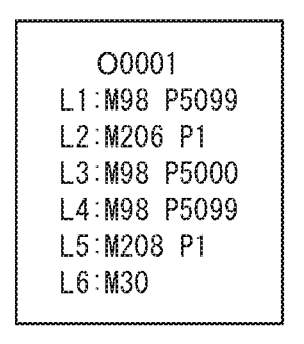
Figure 8:
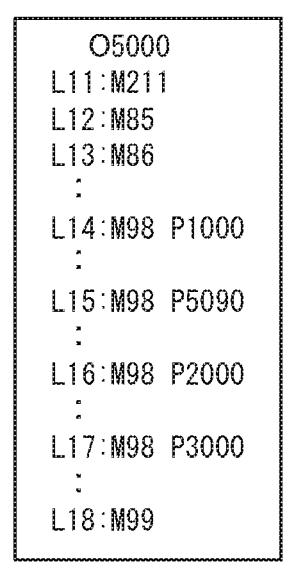
Figure 9:
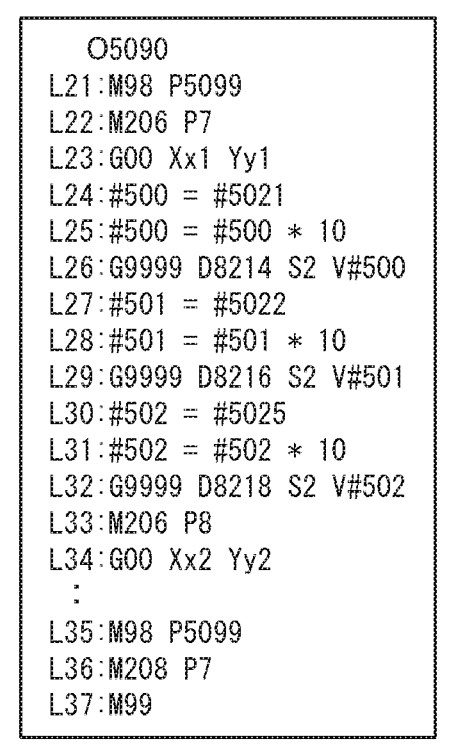

FIG. 7 is a diagram showing an example of a main program generated by the main program generating unit 52*b*. FIG. 8 is a diagram showing an example of a machining program generated by the machining program generating unit 52*c*. FIG. 9 is a diagram showing an example of a core handling program generated by the core handling program generating unit 52*d*. In FIGS. 7, 8 and 9, "L1:", "L2:" and the like are added as line numbers, but these line numbers are added for illustrative purposes in the following description, hence are not given in the actual programs. Now, the programs will be explained, hereinbelow, line by line.

(Main Program)

L1: Call a subprogram 5099 for controlling the wire electrical discharge machine 12 so as to move the worktable 22 to a position for changing the workpiece W. The workpiece changing position is, for example, the lower left position in the work-pan 20 in FIG. 1.

L2: Cause the robot 14 to grip an unmachined workpiece W stored in the workpiece stocker 26 by the end effector 14*b* and attach the workpiece W to the worktable 22.

L3: Call a subprogram 5000 (machining program) for controlling the wire electrical discharge machine 12 so as to machine the workpiece W.

L4: Call a subprogram 5099 for controlling the wire electrical discharge machine 12 so as to move the worktable 22 to the workpiece changing position.

L5: Cause the robot 14 to grip the machined workpiece W by the end effector 14*b*, detach it from the worktable 22 and put it in the workpiece stocker 26.

L6: End the main program.

(Machining Program)

L11: Close the lifting door 32.

L12: Fill the work-pan 20 with the dielectric working fluid.

L13: Turn ON preparations for machining.

L14: Call a subprogram 1000 for controlling the wire electrical discharge machine 12 so as to perform primary machining on the workpiece W.

L15: Call a subprogram 5090 (core handling program) for controlling the robot 14 so as to perform core handling.

L16: Call a subprogram 2000 for controlling the wire electrical discharge machine 12 so as to perform secondary machining on the workpiece W.

L17: Call a subprogram 3000 for controlling the wire electrical discharge machine 12 so as to perform tertiary machining on the workpiece W.

L18: End the machining subprogram.

(Core Handling Program)

L21: Call the subprogram 5099 for controlling the wire electrical discharge machine 12 so as to move the worktable 22 to the workpiece changing position.

L22: Cause the robot 14 to grip the workpiece W by the end effector 14b, detach it from the worktable 22 and move to the core handling area 28.

L23: Move the worktable 22 so as to position the wire electrode 18 at the core handling position 58 for the core C of Shape 1, on the assumption that the workpiece W is placed on the worktable 22.

L24: Store the current position of the worktable 22 on the X-axis in the machine coordinates into an address #500.

L25: Multiply the value in the address #500 by 10 and store the result into the address #500.

L26: Store the value in the address #500 into an address D8214 which performs communication with the robot 14.

L27: Store the current position of the worktable 22 on the Y-axis in the machine coordinates into an address #501.

L28: Multiply the value in the address #501 by 10 and store the result into the address #501.

L29: Store the value in the address #501 into an address D8216 which performs communication with the robot 14.

L30: Store the current position of the worktable 22 on the Z-axis in the machine coordinates into an address #502.

L31: Multiply the value in the address #502 by 10 and store the result into the address #502.

L32: Store the value in the address #502 into an address D8218 which performs communication with the robot 14.

L33: Cause the robot 14 to move the end effector 14b to the core handling position 58 of the workpiece W placed in the core handling area 28. This core handling position 58 is a position obtained by transforming the current position of the worktable 22 on each axis in the machine coordinates stored at L24, L27, L30, into the position on the core C placed in the core handling area 28. Thus, the end effector 14b gives an impact to the core C at the core handling position 58 to remove the core C.

L34: Move the worktable 22 so as to position the wire electrode 18 at the core handling position 58 of the core C of Shape 2, on the assumption that the workpiece W is placed on the worktable 22.

(Hereinafter, program commands similar to L24 to L33 are generated so as to perform core handling for each core C.)

L35: Call the subprogram 5099 for controlling the wire electrical discharge machine 12 so as to move the worktable 22 to the workpiece changing position.

L36: Cause the robot 14 to grip the workpiece W by the end effector 14b, take out it from the core handling area 28 and attach it to the worktable 22.

L37: End the core handling subprogram.

[Operation and Effect]

In the wire electrical discharge machining system 10, the robot 14 for automatically changing the workpiece W on the worktable 22 is installed. The robot 14 can also perform the core handling which the operator has manually performed. The conventional program generating apparatus, when the machining shape of a workpiece W is input, can automatically generate the main program and the machining program shown in FIGS. 7 and 8, but cannot automatically generate the core handling program. Accordingly, the user conventionally has to create a core handling program.

In the core handling program, it is necessary to set core handling positions 58. A core handling position 58 is determined according to the position and shape of the core C in the workpiece W. Conventionally, it has been necessary for the user to analyze the machining program to thereby grasp the positions and shapes of the cores C in the workpiece W before preparing a core handling program. This task requires a lot of labor by the user. Further, since the machining program needs to be analyzed, a high level of expertise is required.

In the present embodiment, the core handling program generating unit 52d of the processing unit 52 is adapted to generate a core handling program according to the shape of a workpiece W input by the user. As a result, the core handling program is automatically generated, so that it is possible to reduce user's labor for programming, and efficiently generate the program. In addition, even a user without a high level of expertise can generate the program for causing the robot 14 to perform core handling.

Further, in the present embodiment, the user designates a desired position on the core C displayed on the screen of the display unit 48 through the input unit 46 so as to set a core handling position 58 in the core handling position setting unit 53c, and the core handling program generating unit 52d generates a program for controlling the robot 14 so as to apply an impact to the core C at the input core handling position 58. In this way, the user can designate a core handling position 58 by a simple operation, and the core handling program generating unit 52d can generate a program for causing the robot 14 to perform core handling at the core handling position 58.

In the present embodiment, the core handling position setting unit 53c calculates the center of gravity of the input shape of the core C, and sets the calculated center of gravity as the core handling position 58. The core handling program generating unit 52d generates a program for controlling the robot 14 so as to apply an impact to the core C at the set core handling position 58. As a result, the core handling position 58 can be automatically set without the need of inputting of a core handling position 58 by the user, and the core handling program generating unit 52d can generate a program for causing the robot 14 to perform core handling at the core handling position 58.

Further, in the present embodiment, when multiple cores C are formed in a workpiece, the core handling program generating unit 52d generates a program for controlling the robot 14 so as to apply an impact to each of the multiple cores C at the corresponding core handling position 58. Thereby, it is possible to generate a program for causing the robot 14 to perform core handling on multiple cores C.

Other Embodiments

Although the embodiments of the present invention have been described above, the specific configuration of the invention is not limited to the above embodiments, but changes in design and the like without departing from the gist of the present invention should also be included in the present invention.

What is claimed is:

1. A program generating apparatus, comprising:
an input unit configured to be operated by a user to thereby input a machining shape of a workpiece; and
a processor configured to generate a machining program configured to control a wire electrical discharge machine so as to machine the workpiece in accordance with the input machining shape of the workpiece and so as to fix, to the workpiece, a core which is produced when the workpiece is machined,
wherein the processor generates a core handling program configured to control a robot so as to remove the core from the workpiece by applying an impact to the core in accordance with the input machining shape of the workpiece, the program generating apparatus further comprising a display unit configured to display on a screen of the display unit the input machining shape of the workpiece and a shape of the core obtained in accordance with the machining shape of the workpiece, wherein:

the input unit designates an arbitrary position on the core displayed on the screen of the display unit by being operated by the user, and the processor generates the core handling program configured to set the arbitrary position designated by the input unit as a core handling position and control the robot so as to apply an impact to the core at the core handling position.

2. A program generating apparatus, comprising:

an input unit configured to be operated by a user to thereby input a machining shape of a workpiece; and a processor configured to generate a machining program configured to control a wire electrical discharge machine so as to machine the workpiece in accordance with the input machining shape of the workpiece and so as to fix, to the workpiece, a core which is produced when the workpiece is machined, wherein the processor generates a core handling program configured to control a robot so as to remove the core from the workpiece by applying an impact to the core in accordance with the input machining shape of the workpiece, and generates the core handling program configured to set a center of gravity of a shape of the core obtained in accordance with the input machining shape of the workpiece as a core handling position and control the robot so as to apply an impact to the core at the core handling position.

3. The program generating apparatus according to claim 1, wherein when the core obtained in accordance with the input machining shape of the workpiece comprises multiple cores, the processor generates the core handling program configured to set the core handling position for each of the cores and control the robot so as to apply an impact to each of the cores at the set core handling position.

4. The program generating apparatus according to claim 2, wherein when the core obtained in accordance with the input machining shape of the workpiece comprises multiple cores, the processor generates the core handling program configured to set the core handling position for each of the cores and control the robot so as to apply an impact to each of the cores at the set core handling position.

* * * * *